(12) United States Patent
Saliba

(10) Patent No.: US 7,077,354 B2
(45) Date of Patent: *Jul. 18, 2006

(54) EDGE GUIDING TAPE REEL

(75) Inventor: George A. Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/349,152

(22) Filed: Jan. 21, 2003

(65) Prior Publication Data

US 2004/0140390 A1 Jul. 22, 2004

(51) Int. Cl.
*G11B 23/07* (2006.01)
*B65H 75/12* (2006.01)

(52) U.S. Cl. ............... 242/348; 242/614; 360/132
(58) Field of Classification Search ............ 242/614, 242/345, 348; 360/132
See application file for complete search history.

(56) References Cited

U.S. PATENT DOCUMENTS

| 4,704,645 | A | | 11/1987 | Murphy et al. |
| 5,371,638 | A | | 12/1994 | Saliba |
| 5,474,253 | A | * | 12/1995 | Kasetty et al. ............... 242/614 |
| 5,803,388 | A | | 9/1998 | Saliba et al. |
| 6,062,500 | A | | 5/2000 | Coles |
| 6,386,470 | B1 | * | 5/2002 | Vanderheyden ........... 242/332.7 |
| 6,398,143 | B1 | | 6/2002 | Kim et al. |
| 6,435,451 | B1 | | 8/2002 | Leonhardt ................... 242/614 |
| 6,786,445 | B1 | | 9/2004 | Todd et al. |

OTHER PUBLICATIONS

U.S. Appl. No. 10/349,481, filed Jan. 21, 2003, Saliba.
U.S. Appl. No. 10/349,498, filed Jan. 21, 2003, Saliba.

* cited by examiner

*Primary Examiner*—John Q. Nguyen
(74) *Attorney, Agent, or Firm*—Morrison & Foerster LLP (57) ABSTRACT

Tape is spooled onto a hub by receiving the tape between guide members. The guide members guide one or both edges of the tape as the tape begins to wrap around the hub and floats on a layer of air formed between the tape and a previously wound layer of the tape.

34 Claims, 12 Drawing Sheets

EDGE GUIDING TAPE REEL

BACKGROUND OF THE INVENTION

1. Field of the Invention

The present invention relates generally to tape reels for tape drives, and more particularly to take-up or supply reels for controlled uniform stacking of storage tape in tape drives to reduce lateral tape motion.

2. Description of the Related Art

Magnetic tapes are commonly used for data storage in computer systems. Magnetic tapes are typically housed in open reels, tape cartridges, and tape cassettes. Open reels include a hub upon which the tape is wound and flanges that protect the tape edges but are not housed in a container. When open reels are used in a magnetic tape drive, the tape from one reel (a supply reel) is spooled onto another reel (a take-up reel). A tape cartridge typically includes a container having a single reel upon which the tape is initially wound. When a tape cartridge is used in a magnetic tape drive, the tape on the reel in the tape cartridge is spooled onto a take-up reel in the magnetic tape drive. A tape cassette typically includes a container having two tape reels, a supply reel upon which the tape is initially wound and a take-up reel. When a tape cassette is used in a magnetic tape drive, the tape on the supply reel in the tape cassette is spooled onto the take-up reel in the tape cassette. Thus, when a tape cassette is used, the tape stays within the cassette container.

As a tape moves between a supply reel and a take-up reel during operation, the tape is guided over a read/write head to read data from and/or write data to the tape. However, transverse motion of the tape relative to the read/write head (lateral tape motion) as the tape moves between the supply and take-up reel may cause misalignments between the recorded track positions on the tape and the head. Such tracking errors may reduce data reliability. For example, during a write operation, lateral tape motion may prevent straight tracks from being written on the tape and may result in subsequent read errors. During a read operation, lateral tape motion may prevent the read head from being aligned at the center of the desired track on the tape, which may lead to data errors.

Multiple parallel tracks are typically written on a tape to increase the data rate capability of the tape. In general, the greater the number of tracks positioned on a tape, the more information may be stored on the tape. Consequently, track separation on tapes has continued to decrease in order to accommodate more tracks and greater storage capacity. As a result, it is desirable to control lateral tape motion as the tape passes over a read/write head during read/write operations in order to ensure that the desired track is accurately positioned on the head for read/write operations.

Figure 1:
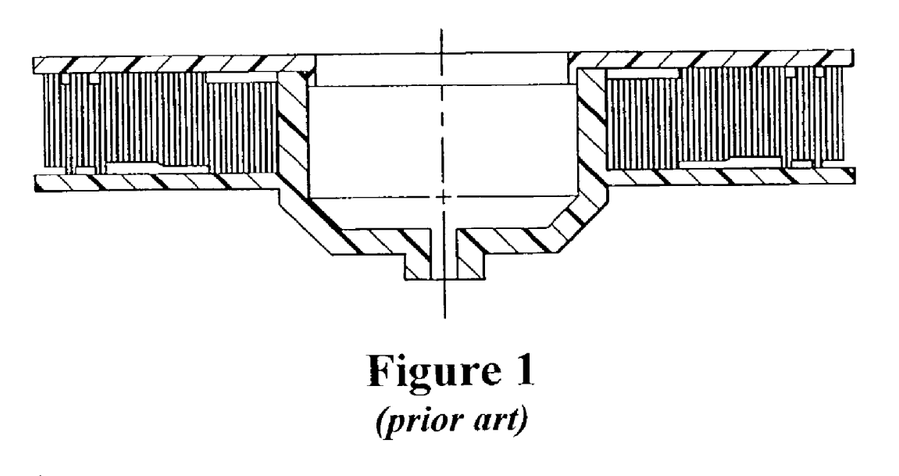
FIG. 1 illustrates a cross-sectional view of a prior art tape reel.

One approach to reduce lateral tape motion has been to ensure that the tape is stacked uniformly on both supply and take-up reels. As shown in FIG. 1 (prior art), as each individual loop stacks, the tape may slide laterally up or down as it spools around the reel. As such, the tape is non-uniformly stacked on the reel. Non-uniform stacking of tape on the reels may cause the tape to experience lateral motion as it is unwound and passes over a read/write head.

When tape spools on a reel, it squeezes out the layer of air that is trapped between the outer surface of the tape in the reel and the in-coming tape. By increasing tape tension and surface roughness of the tape, the tape may be more uniformly stacked on the reel because the trapped layer of air is more efficiently removed. The use of higher tape tension to reduce the sliding up and down of the tape as it spools on the reel, however, is less effective when using thin tapes typically used in current tape drives. Additionally, high tape tension increases the read/write head and tape wear, which reduce the life of the tape.

BRIEF SUMMARY OF THE INVENTION

In one exemplary embodiment a method and apparatus for aligning and stacking tape on a take-up reel or supply reel is provided. Tape is spooled onto a hub by receiving the tape between guide members. The guide members guide one or both edges of the tape as the tape begins to wrap around the hub and floats on a layer of air formed between the tape and a previously wound layer of the tape.

The present invention and its various embodiments are better understood upon consideration of the detailed description below in conjunction with the accompanying drawings and claims.

DETAILED DESCRIPTION OF THE INVENTION

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

Figure 2A:
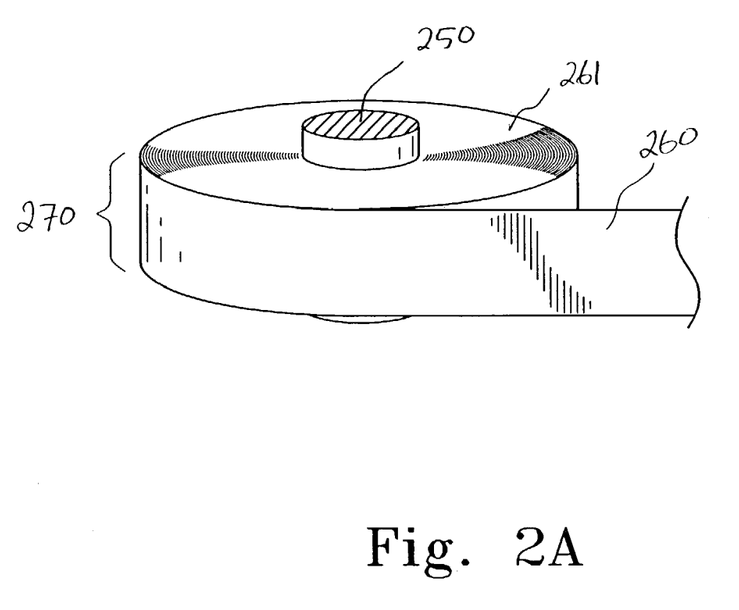
FIGS. 2A and 2B illustrate an exemplary tape-to-reel interaction during tape spooling.
Figure 2B:
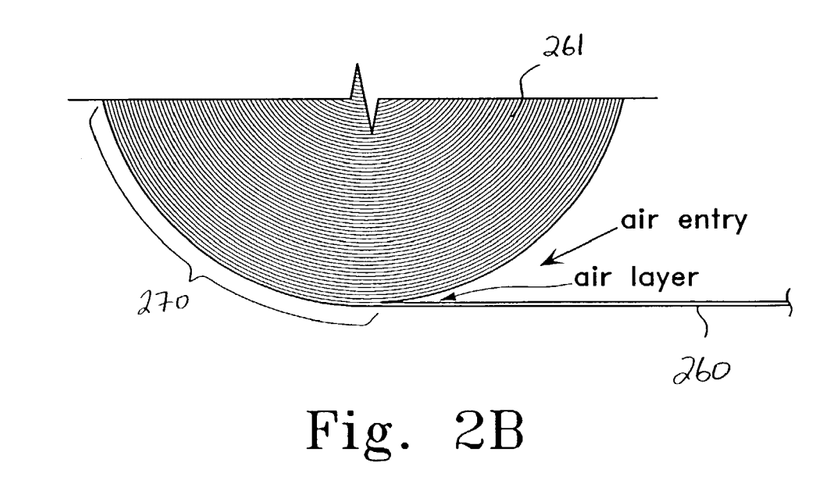

FIG. 2A illustrates a typical tape to reel interaction during tape spooling, i.e., winding tape onto the hub of a reel. For illustrative purposes, only hub 250 of the reel and tape 260 are shown. FIG. 2B illustrates a top view of a portion of the spooled tape 261 in the region where tape 260 begins to wrap over spooled tape 261. As tape 260 is wrapped over the previous layer of tape of spooled tape 261 air enters or becomes trapped between 260 and 261. This effect is amplified with smooth tape, for example, current metal particle ("MP") tape or the like being wound at relatively high speeds. For example, speeds of 100 to 200 inches per second are common, and speeds of 400–1000 inches per second or more are contemplated for exemplary reels described below. In the region 270, generally located on the left half of FIG. 2A and where 260 begins to be wrapped around spooled tape 261, a thin layer of air may become trapped. Tape 260 momentarily floats on this thin layer of air before "squeezing" it out as tape 260 is rotated and stacked on spooled tape 261. Tape 260 may be more easily guided and aligned with spooled tape 261 while tape 260 is floating on this cushion or thin layer of air. Additionally, efficient removal of this air is important to ensure that tape stacks evenly on the reel.

A tape reel may be used, for example, in magnetic tape drives to spool tape while information is either written on the tape or read from it. In one exemplary embodiment, the tape reel includes one or more pairs of upper and lower guiding members positioned on opposite sides of a hub. The guiding members may be circular flanges, partial flanges such as butterfly or propeller shapes, and the like. The upper and lower guiding members are configured to receive and guide the tape as it is spooled onto the hub. In one example, the guiding members include a narrow portion between the guiding members that physically guides the edges of the tape to be aligned with the previous layer of wound tape as the air escapes from beneath the tape. In another example, the narrow portion between the guiding members physically guides the edges of the tape to align and "push" the tape down and squeeze the air out from between the tape and the previous layer of wound tape as the reel rotates. More specifically, the guiding members guide the tape as it floats on a thin layer of air trapped between the tape and the previous layer of the tape spooled on the hub to improve tape reel guiding and stacking.

Improved tape reel guiding and stacking reduces lateral tape motion, i.e., transverse motion of the tape relative to a linear path of the tape past a read/write head. In particular, more uniformly stacked tape may be unwound more smoothly with reduced lateral tape motion. Additionally, reduced lateral tape motion improves servo track effectiveness by a servo head or the like, i.e., the ability to detect lateral tape motion and track data tracks formed on the tape is improved. Effective tape guiding further reduces tape damage during winding and unwinding of the tape allowing for the use of relatively thin and smooth high capacity metal particle tapes, for example.

Figure 3:
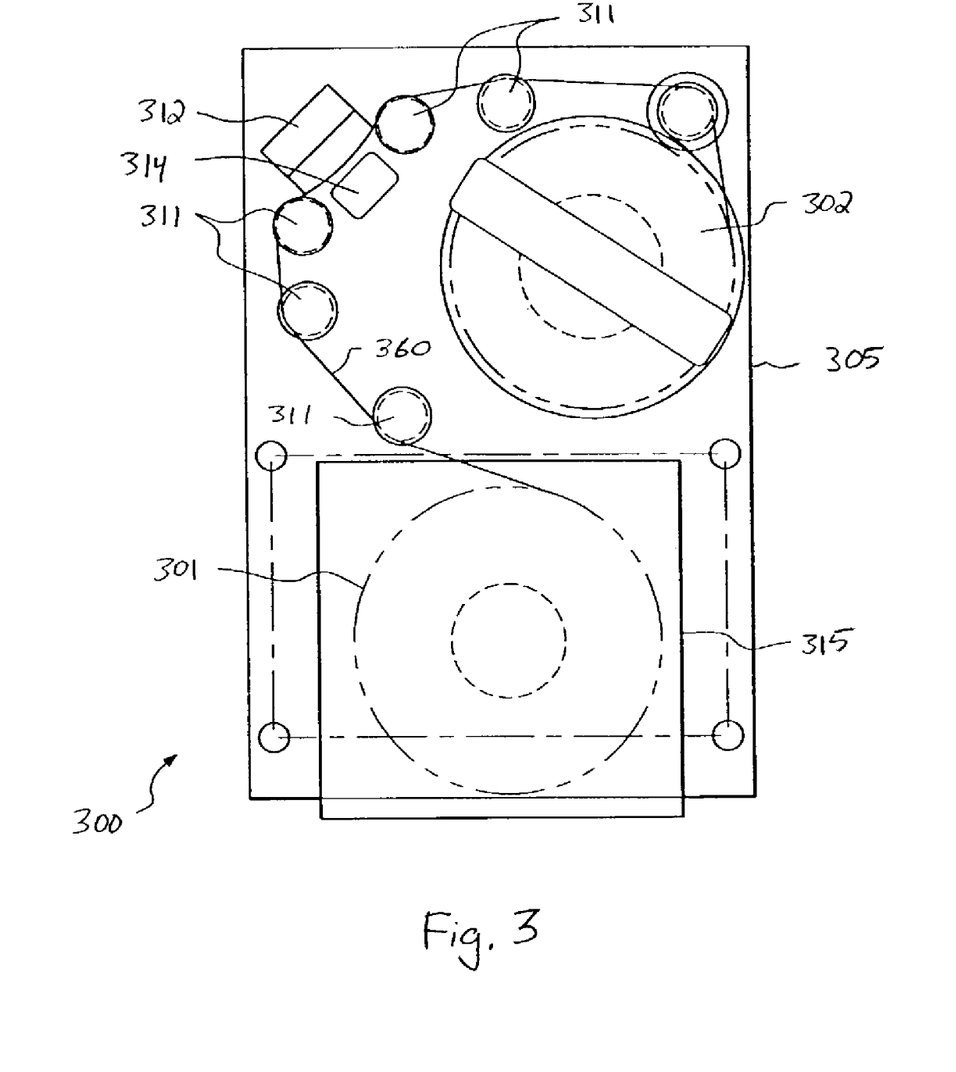
FIG. 3 illustrates an exemplary tape drive including a take-up reel according to one example.

FIG. 3 illustrates an exemplary tape drive 300 housing one or more supply reels with guiding members. Tape drive 300 includes a supply reel 301 having tape 360 spooled onto it, rollers 311, read/write head 312, and a take-up reel 302 within housing 305. The supply reel 301 is rotatably mounted within a removable cartridge 315. During a read/write operation, the tape 360 spools out of either the take-up reel 302 or the supply reel 301, with rollers 311 guiding the tape 360 as it passes over one or more read/write heads 312 and then stacks up on the take-up reel 302, one loop after another, with an increasing radius. For the purposes of ease of explanation, this example will be described with respect to take-up reel 301, however, the same principles apply to supply reel 302.

Tape drive 300 may be installed within a computer, a tape drive array, as part of a tape library, and the like. A detailed description of the various components of a tape drive such as tape drive 300 may be found in U.S. Pat. No. 5,371,638, issued to G. Saliba and which is incorporated herein by reference in its entirety. Accordingly, only the structural aspects of tape drive 300 that are of particular significance to the present discussion are described in detail.

Tape drive 300 includes one or more head assemblies 312 that read and/or write data from and/or onto the storage tape 360. The design and number of head assemblies may vary depending upon the requirements and application of tape drive 300. Tape drive 300 may further include one or more servo heads 314 to detect lateral tape motion.

Storage tape 360 stores data information in a form that may be subsequently retrieved. For example, a magnetic storage tape 360 may be used to store data in digital format. The storage tape 360 preferably has a tape width of approximately 0.500 inches, however any size tape 360 and correspondingly sized take-up reel is contemplated. The thickness of storage tape 360 may be approximately 0.005 inches, although thinner or thicker tapes are contemplated.

Storage tape 360 includes a storage surface on a major side of storage tape 360 for storing data. The opposite major surface of storage tape 360 typically does not contain data and is positioned to be in contact with rollers 311 along a path between supply reel 301 and take-up reel 302. The storage surface of storage tape 360 may face and contact head assembly 312. A servo head 314 may be positioned on either side of tape storage tape 360. Servo head 314 may follow a servo pattern on storage tape 360 to detect lateral tape motion and provide feedback signals to the head assembly 312 to follow the correct data track. Servo head 314 may be, for example, an optical or magnetic servo head. The storage tape may be divided into a plurality of tracks, where each track includes a linear pattern that extends the length of the storage tape 360. Alternatively, for example, the data may be stored in diagonal strips across the storage tape 360. It should be recognized that various other exemplary storage tapes 360 with various surface configuration and data configurations may be used.

Figure 4A:
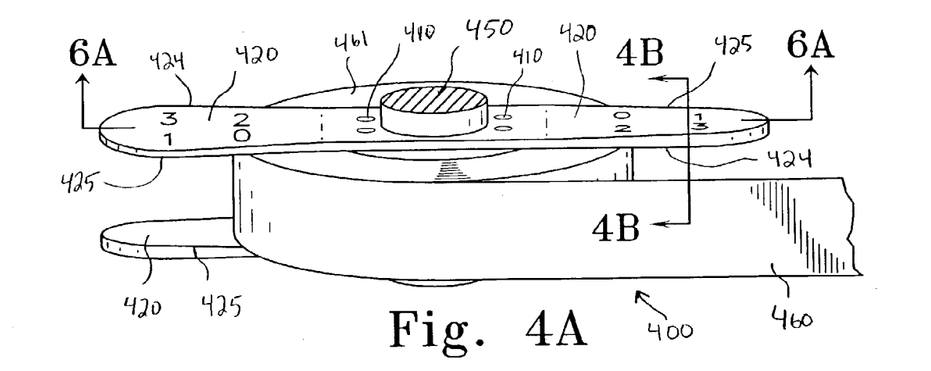
FIGS. 4A, 4B, and 4C illustrate various views of an exemplary take-up or supply tape reel for guiding and uniformly stacking tape.
Figure 4B:
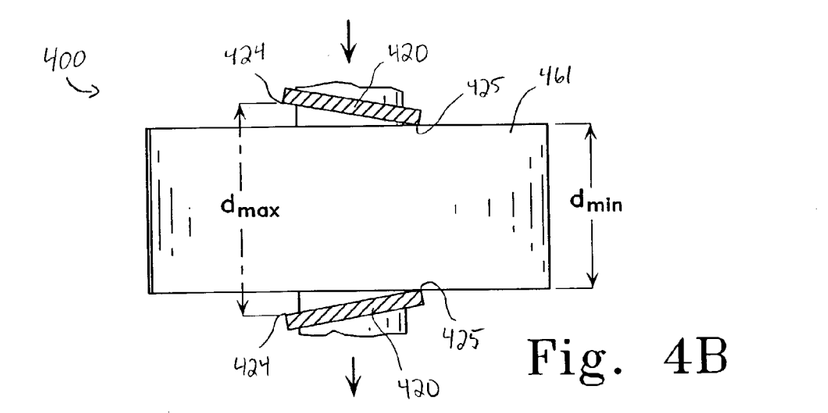
Figure 4C:
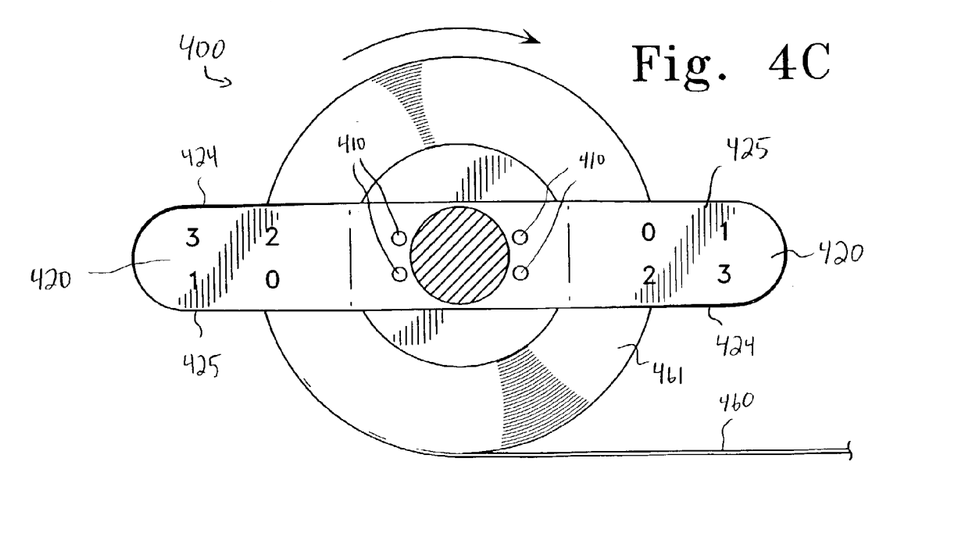

FIGS. 4A, 4B, and 4C illustrate various views of an exemplary take-up and/or supply reel for guiding and uniformly stacking a storage tape according to one embodiment. In this particular example, the reel includes at least one pair of guiding members formed as guiding arms that generally resemble butterfly wings from the top view, and is therefore occasionally referred to as a "butterfly reel."

Specifically, tape reel 400 includes two pairs of arms or-guiding members 420, wherein each pair of guiding members 420 includes two guiding members 420 spaced apart on hub 450. Guiding members 420 are spaced apart sufficiently to allow tape 460 to pass between the facing or inner surfaces of guiding members 420. Further, guiding members 420 may be separated such that the facing surfaces of each guiding member 420 are separated by a minimum distance/separation in a direction parallel to the axis of hub 460 equal to the width of the tape 460 or slightly larger than the width of the tape 460. Further, the inner surface of the guiding members may be shaped to have various separations to receive and guide tape 460. For example, a wide separation between the surfaces for receiving the tape 460 and a narrow separation therebetween configured to guide and uniformly stack tape 460 as the reel rotates when spooling tape 460 around hub 450. For instance, the guiding members may be shaped such that the leading edges 424, i.e., the edges that approach tape 460 first when spooling tape onto the reel, are farther apart in a direction parallel to the axis of rotation of the hub than a minimum or narrow separation region of the guiding members 420. The narrow separation region may be located anywhere other than the leading edge 424, for example, at the trailing edge or a location between the leading edge 424 and the trailing edge, such as the middle of guiding member 420.

Hub 450 is cylindrical in shape as shown in FIG. 4A, however, other shapes suitable for spooling tape may be used; for example, a polygon shape or the like. Further, guiding member 420 may be fixed to hub 450 in any suitable manner or formed integral with hub 450. A single structure may form the upper guiding members 420 for both pairs of guiding members 420 or each guiding member 420 may be separately attached to hub 450.

FIG. 4B illustrates a cross-sectional side view of reel 400 along line 4B—4B of FIG. 4A, and depicts the relationship of guiding members 420 with tape 460 and spooled tape 461. As seen, the distance between the leading edges 424 of guiding members 420 is greater than a minimum distance located past the leading edge 424, in this case at or near the trailing edge 425. As guiding members 420 rotate clockwise as seen from the top view, tape 460 passes between guiding members 420 first through the wide opening of the leading edge 424. As guiding members 420 further rotate, the distance between guiding members 420 reduces to a minimum or narrow separation. The minimum distance may be equal to the width of the tape such that as the guiding members rotates the tape 460 is guided by the edge of tape 460 and uniformly stacked on the previous loop of tape 460.

As may be more clearly seen with reference to FIGS. 4A, 4B, and 4C in conjunction, guiding members 420 rotate and tape 460 passes between the inner surfaces of guiding members 420 through the relatively wide opening, i.e., larger than tape 460, at the leading edge 424 of guiding member 420. As guiding members 420 further rotate and are positioned in a region of spooled tape 461 similar to the left side of FIGS. 4A and 4C, the distance between guiding members 420 decreases to a minimum or narrow distance that may be substantially equal to the width of tape 460. Tape 460 is therefore guided by the minimum distance between guiding members 420 in the region where tape 460 is floating on a thin air layer trapped between tape 460 and spooled tape 461. This thin layer of air allows guiding members 420 to effectively guide tape 460 in a near fluid state and stack tape 460 uniformly on the previous tape layer of spooled tape 461 with little friction with the underlying layers of tape.

In this example, guiding members 420 are shaped or bent to form a wide opening between the inner surfaces of the guiding member 420 to receive tape 460 by adjusting positioners 410 in a fashion to receive and uniformly stack tape as it is spooled around hub 450. Positioners 410 may include screws threaded between the guiding members 420 and/or the hub 450 in a manner suitable to apply a force to guiding members 420 such that opposing surfaces of guiding members 420 are disposed in a non-parallel relationship. Positioners 410 may be fixed at the time of manufacturing to hold guiding members 420 in fixed relationship with respect to the hub. Additionally, positioners 410 may be adjusted to tune the gap or distances between the opposing surfaces of guiding members 420. In other examples, guiding members 420 may be preformed and attached by any suitable method to hub 450 as well as being formed integral with hub 450.

Numbers "0," "1," "2," and "3," illustrated in FIG. 4C indicate relative distances between opposing facing or inner surfaces of guiding members 420 in a direction parallel to the axis of hub 450 according to one example. The arrow indicates the direction reel 400 rotates about the axis during a take-up or spooling process of a tape 460. As the tape 460 passes between the leading edges 424 of guiding members 420, the guiding members are at a maximum distance apart indicated by distance "3." The tape is then guided and aligned to the spool of tape 461 by the opposing inner surfaces of guiding members 420 as the distances between the inner surfaces narrow. In this example, the distance narrows to a minimum distance located near the trailing edge 425 of the guiding members 420 indicated by distance "0." The minimum distance between guiding members 420, indicated by "0" may be, for example, the width of the tape or a suitable distance to uniformly stack tape 460 and reduce lateral tape motion to a desirable level. Numbers "1" "2," and "3," may indicate various distances greater than "0," with "3," indicating the largest distance.

Various other patterns shown by numbers "0," "1," "2," and "3," are possible. For example, the leading edge distance may both be a "3," and the trailing edge distance both a "0," as well as any other suitable scheme to guide tape 460. Further, the distance between opposing surfaces of guiding members 420 may vary linearly or non-linearly from a narrow to wide region of guiding member 420. The narrow distance region may be located at various locations on guiding member 420, for example, the narrow distance could be in the middle or adjacent the leading edge 424.

In one example, the minimum distance may be equal to the width of the tape to be spooled. Because tape 460 is guided in a region where it is nearly frictionless, the opening between guiding members 420 may be sized equal to the width of tape 460 without excessive damage to the edges of tape 460. Further, in some instances the minimum distance between guiding members 420 may be made slightly less than tape 460. Tape under tension may result in a slight reduction in the width of tape 460. The width of a 0.500 inch tape, for example, may reduce to approximately 0.498 inches in width during use, i.e., when under tension. In this case the minimum distance may be between 0.498 and 0.505 inches for a typical 0.500 inch tape, preferably between 0.498 and 0.503 inches, and more preferably between 0.498 and 0.500 inches. Further, depending on the particular application and how much the width of the tape decreases under tension, smaller distances may be used.

Opposing surfaces of guiding members 420 preferably vary in their distances smoothly or gradually between the distances indicated by "0," "1," "2," and "3." This results in the tape being gently and smoothly guided to a more uniform position on hub 450. Depending on manufacturing considerations, however, various non-smooth surfaces may be used with guiding members 420.

In the present exemplary embodiment, one rotation of reel 400 aligns a loop of tape 460 twice as it is spooled onto the spool of tape 461, i.e., as each pair of guiding members 420 rotates once. Each pair of guiding members 420 may have the same or different shapes and separations resulting in differing alignment precision. For example, one pair of guiding members 420 may provide a coarse alignment and a second pair of guiding members 420 may provide a fine alignment, such as where the narrow distance region of one pair of guiding members 420 is larger than the narrow distance region of the second guiding members 420. This could also be done with more than two pairs of guiding members 420 with progressively finer alignments to provide more uniform stacking as well as different random alignments depending on the particular application.

Guiding members 420 may be made of any suitable material for tape reels. For example, guiding members 420 may be formed out of aluminum, plastic, or other hard material. Guiding members 420 may also be made of a combination of any suitable materials for tape reels. For example, guiding members may be formed out of aluminum covered with nickel, which may protect the aluminum material with greater durability. Additionally; ceramics with a hard coating such as diamond-like-carbon "DLC" or other suitable coating may be used. Preferably, the guiding members include a material, at least on the inner surfaces, which has a low coefficient of friction with the tape to prevent excessive damages to the edges of the tape.

Figure 5:
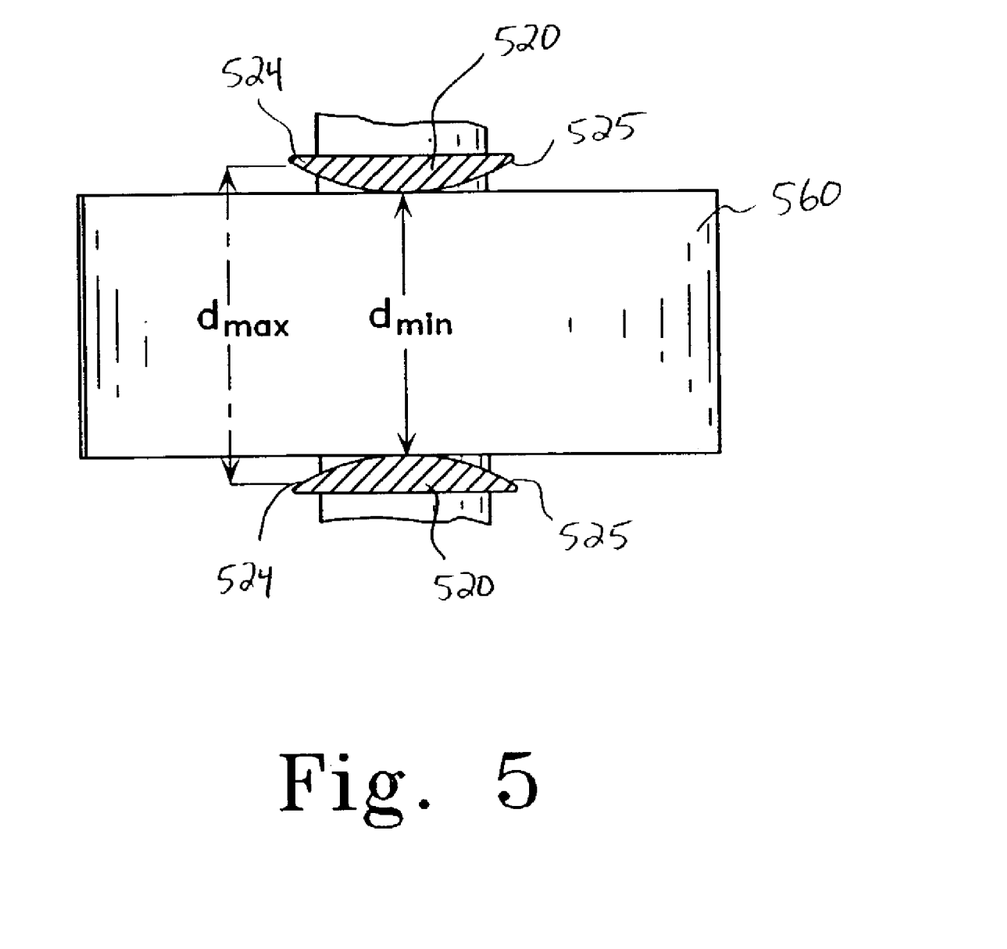
FIG. 5 illustrates a cross-sectional view of a tape reel along line 4B—4B of FIG. 4A.

FIG. 5 illustrates a cut-away view along view line 4B—4B as shown in FIG. 4A according to another example of how guiding members 420 may be shaped. In this example, guiding members 520 include a wide or large distance between opposing surfaces near the leading edges 524 as well as the trailing edges 525. This "balanced" design of wide-narrow-wide distances between the opposing guide members 520 may reduce the tape edge wear as tape is supplied from the reel 500 as well as during take-up. The narrow distance between guiding members 520 is located generally in the middle region of guiding members 520 between leading edge 524 and trailing edge 525. The narrow distance between guiding members 520 may therefore be located at various locations between the leading edge 524 and the trailing edge 525 (or at the trailing edge 525). The narrow distance may be between 0.498 and 0.505 inches for standard 0.500 inch tape, while the wide distance may be between 0.503 to 0.520 inches or larger depending on the desired product tolerances and the like.

Figure 6A:
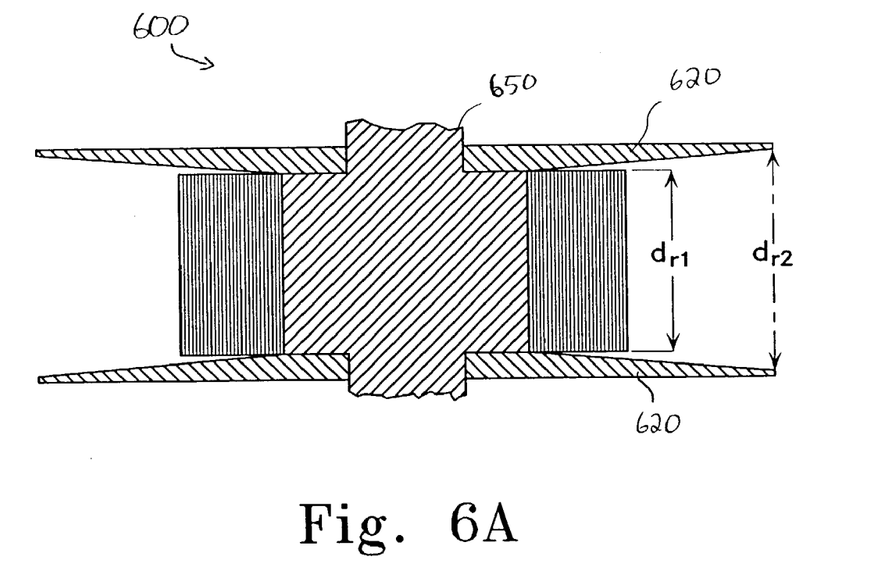
FIGS. 6A and 6B illustrate side views of exemplary tape reels illustrating guide members with and without taper respectively.
Figure 6B:
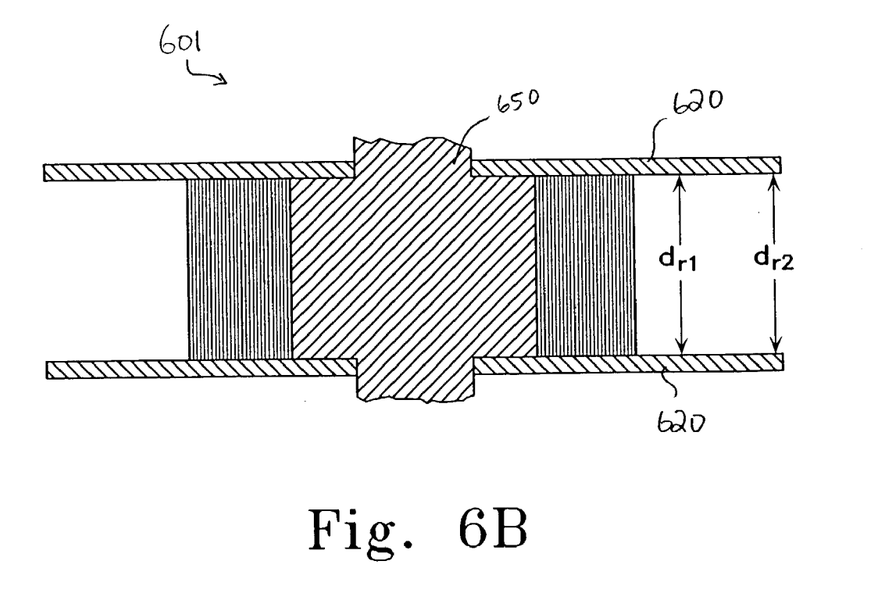

FIGS. 6A and 6B illustrate side views of exemplary tape reels 600 and 601 with guiding members 620 that include taper and guiding members 620 that are formed without taper, respectively. Taper generally refers to a diverging relationship between flanges or guiding members 620 as they extend radially away from hub 650. As seen in FIG. 6A opposing guiding members 620 diverge as guiding members 620 extend away from hub 650. For example, distance $d_{r1}$ between guiding members 620 is larger than the distance $d_{r2}$ located at a greater radial distance from hub 620. The wider separation distance between the guiding members 620 at the circumferential outer edges enables tape to enter between guiding members 620 and reel 600 with a reduced chance of hitting or rubbing against an edge of guiding members 620 to reduce tape edge damage.

FIG. 6B, however, illustrates another example, where guiding member 620 are formed without taper. In this instance, guiding members 620 extend parallel with respect to each other such that $d_{r1}$ and $d_{r2}$ are substantially equal. Because guiding members 620 may be shaped with a relatively wide separation between corresponding leading edges of a pair of guiding members 620 (see, e.g., FIGS. 4B, 4C, and 4E), a taper may not be needed to prevent hitting the tape and causing tape edge damage. For example, the narrow distance region between the guiding members 620 need not diverge with distance from the hub 650. The wide distance between opposing guiding members 620 allows the tape to pass therebetween with out hitting the edge of the tape and causing damage. Therefore, it should be recognized that various designs may include guiding members with or with out taper depending on the particular application and design considerations. Further, a wide region may include a taper with a narrow region without a taper, or vice versa.

Figure 7:
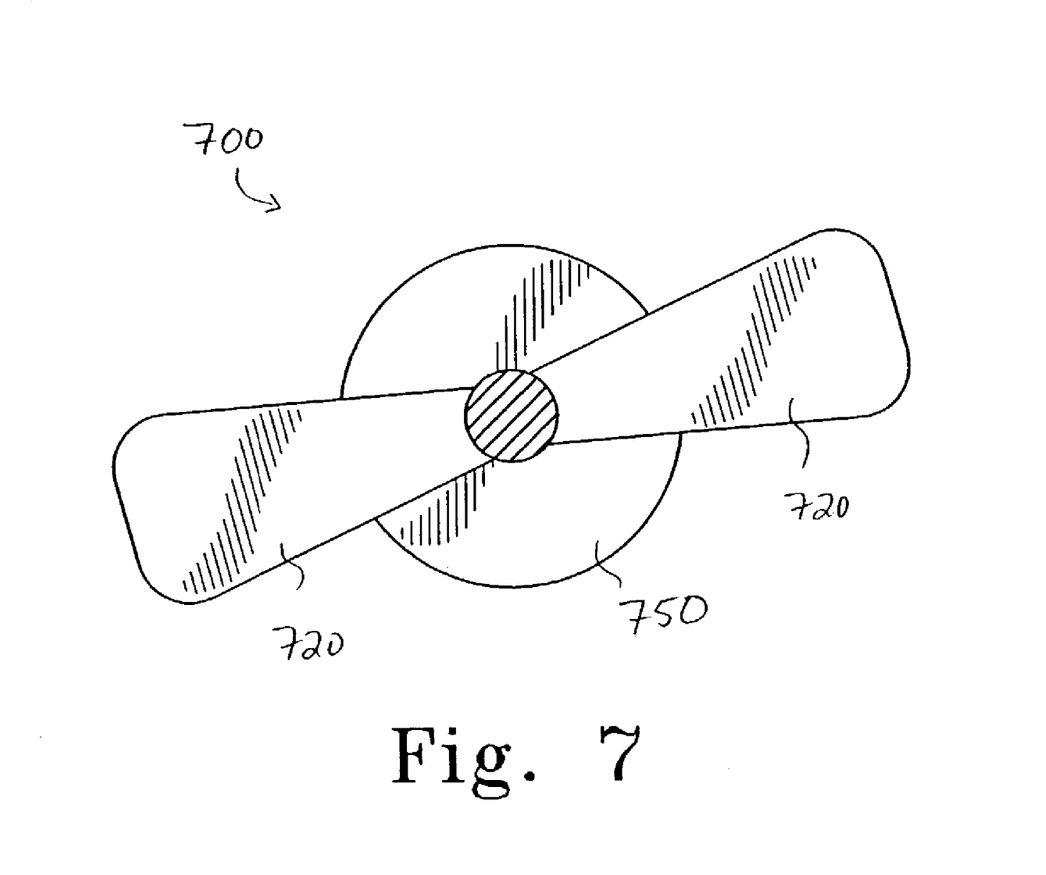
FIG. 7 illustrates a top view of an exemplary take-up or supply tape reel.

FIG. 7 illustrates a top view of another exemplary tape reel 700. In this example, tape reel 700 includes two pair of opposing guiding members 720 on opposite sides of hub 750. In this example, guiding members 700 are formed to have a "bow-tie" shape, wherein the width as seen from the top view increases with distance form the axis of rotation. The distance between the surfaces of opposing guiding members 700 may include any of the variations previously discussed; for example, a wide leading edge followed by a narrow distance portion between opposing surfaces of guiding member 720 located somewhere along the guiding member 720 to uniformly stack tape onto the reel. This design is illustrative only and it should be recognized that various other shapes may be included such as fan, blade, hook, boomerang, or other suitable shape that includes a relatively wide opening and a relatively narrow distance therebetween to guide and uniformly stack the tape.

Figure 8:
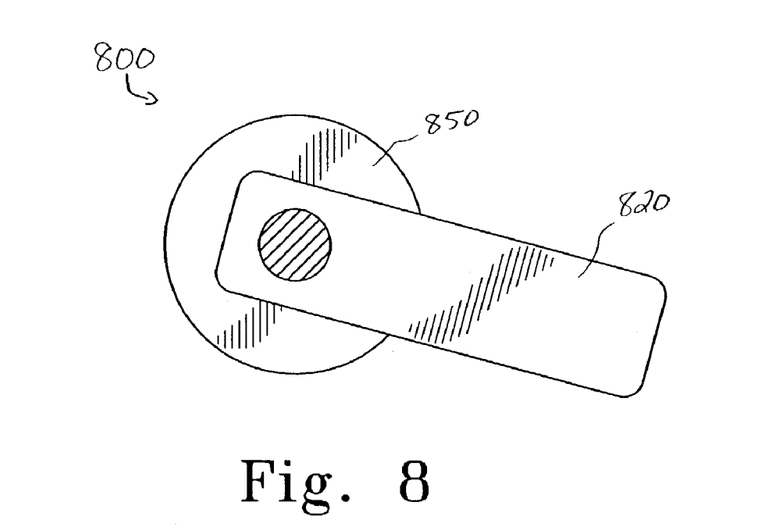
FIG. 8 illustrates a top view of an exemplary take-up or supply tape reel.

FIG. 8 illustrates another exemplary tape reel 800. In this example, tape reel 800 includes a single pair of opposing guiding members 820 on opposite sides of hub 850. It should be recognized that any number of pairs of opposing guiding members 820 may be included depending on the particular application. Again, guiding members 820 may have any shape to achieve the desired distances between the opposing inner surfaces to guide and align a tape. For example, any of the shapes described with regard to FIGS. 4B, 4C, and 5, as well as any other suitable shape may be used. Further, hub 850 may be equipped with a weight (not shown) or the like positioned or mechanically coupled to hub 850 to ensure that reel 820 is properly balanced as it rotates about a central axis. Balancing reel 800, or any other exemplary reel, may further increase uniform stacking and reduce lateral tape motion.

Figure 9:
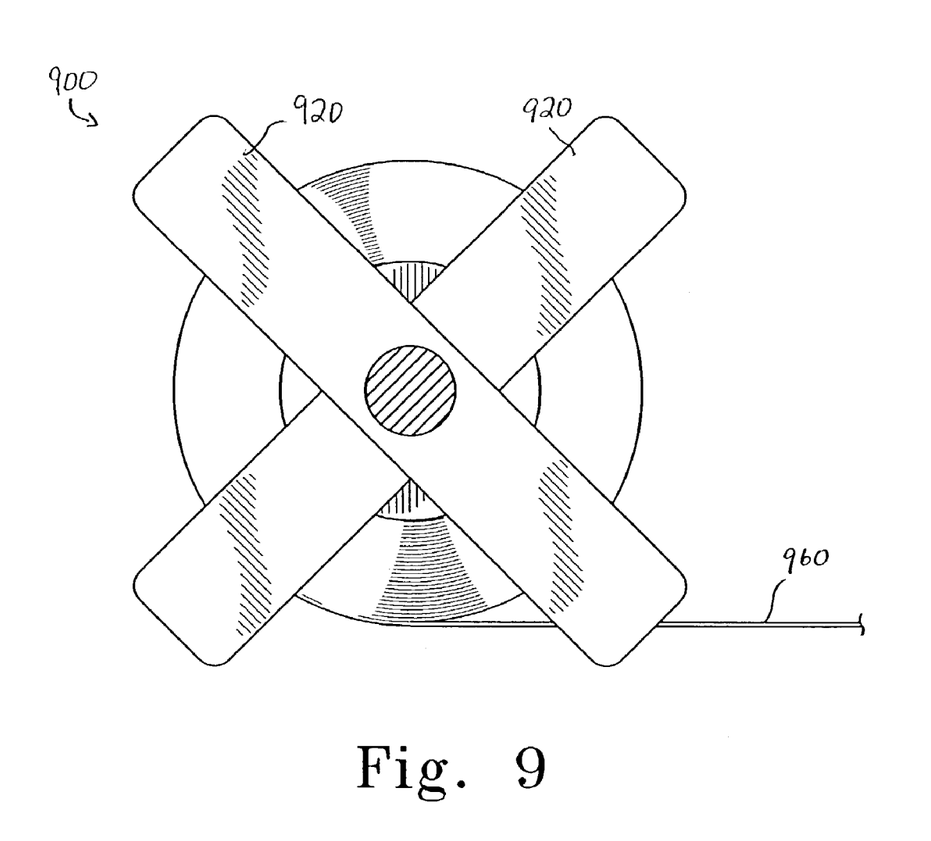
FIG. 9 illustrates a top view of an exemplary take-up or supply tape reel.

FIG. 9 illustrates a top view of yet another exemplary tape reel 900. In this example, four pairs of opposing guiding members 920 are included on reel 900. The four top guiding members 920 may be formed of a single integral piece, two pieces positioned cross wise, or four separate members attached to hub 950. Again, each guiding member 920 may include any of the previously discussed shapes to achieve a desired narrow/wide distance pattern between the opposing inner surfaces of each guiding member 920 pair. Additionally, each pair of guiding members 920 may include a different shape and/or different narrow/wide distance pattern between opposing inner surfaces. For example, guiding members 920 may have progressively finer guiding and alignments of the tape 960 by having progressively smaller minimum separations between successive pairs of guiding members 920. Alternatively, the guiding members 920 may be randomly positioned to provide different levels of guiding and alignment or staggered to provide alternating coarse alignments and fine alignments in one full rotation.

Figure 10A:
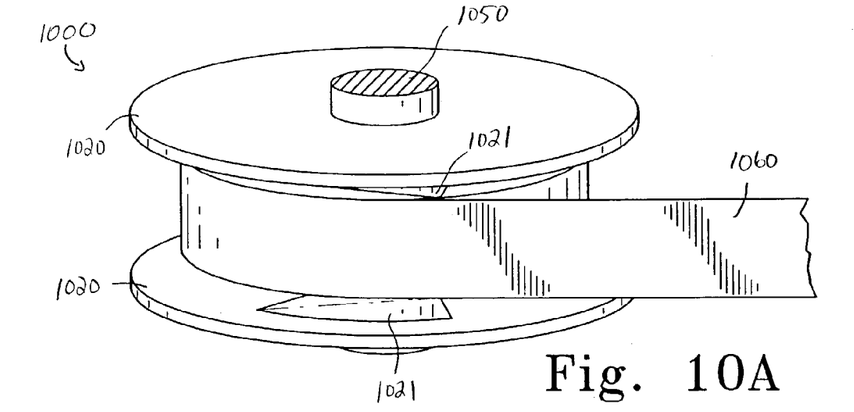
FIGS. 10A, 10B, and 10C illustrate various views of an exemplary take-up or supply tape reel.
Figures 10B, 10C:
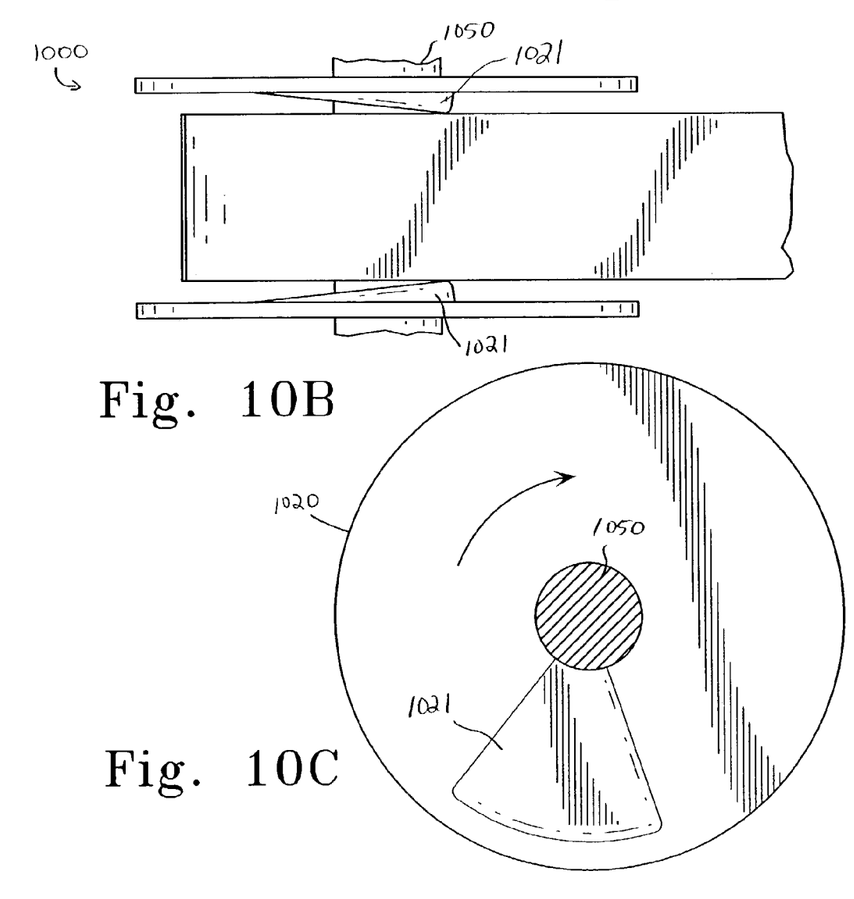

FIGS. 10A, 10B, and 10C illustrate various views of an exemplary reel 1000 according to another embodiment. In this example, reel 1000 includes two flange shaped guiding members 1020 that guide and align tape 1060 as it passes between the inner surfaces of guiding members 1020. Guiding members 1020 form at least one wide region between the opposing surfaces near the outer circumference of the guiding members, i.e., a relatively large distance between the inner surfaces of guiding members 1020. The relatively wide region allows tape 1060 to enter a portion of the reel between guiding members 1020 without hitting guiding members 1020 causing possible tape edge damage. The relatively wide region may be achieved through tapered portions of guiding members 1020 as described above or simply separating the guiding members 1020 in the wide region sufficiently to allow entry of tape 1060 between guiding members 1020 without undue edge damage. Guiding members 1020 further include at least one narrow region, i.e., a relatively small distance between the inner surfaces of guiding members 1020, configured to guide and align tape 1060 as reel 1000 rotates.

FIG. 10B illustrates a side view of reel 1000 and FIG. 10C illustrates a plan view of the inner surface of the lower guiding member 1020 to further describe reel 1000. As seen, the inner surfaces of guiding members 1020 are contoured with corresponding wedges or relief patterns that are configured to uniformly guide and stack tape 1060 as reel 1000 winds tape 1060 to hub 1050. In particular, as the guiding members 1020 rotate while spooling tape 1060 onto reel 1000, tape 1060 enters between guiding members 1020 with decreased potential for damage because a large distance or clearance is provided as shown on the left side of FIG. 10C. For example, the distance in this region may be 0.502 to 0.520 inches for typical 0.500 inch tape depending on system tolerances. Because the distance in this region is relatively wide compared to the tape width, guiding members 1020 do not necessarily need to be tapered. In some applications, however, guiding members may be tapered to have a similar or wider opening and a narrower distance in the region near hub 1050.

In this example, a wedge shaped or contoured guiding portion 1021 is located on the inner surface of guiding members 1020. The contoured portion 1021 narrows the distance between opposing guiding members 1060 as the reel 1000 rotates to guide and align tape 1060 to hub 1050 while tape 1060 is in a fluid state similar to the previous "butterfly" examples. For example, the guiding members 1060 may be positioned such that the minimum distance between the guiding portions is between 0.480 and 0.505 inches for 0.500 inch tape, preferably less than 0.503 inches and more preferably between 0.480 and 0.500 inches or less for 0.500 inch tape.

As shown in FIG. 10C, much of the inner surface of guiding member 1020 may be shaped to create a large distance or opening between guiding members 1020, with the contoured guiding portion 1021 provided to guide and align tape 1060 once per rotation. The width or area that guiding portion 1021 occupies on guiding member 1020 may vary depending on a desired abrupt or smooth guiding process. Further, multiple guiding portions 1021 may be included on guiding members 1021. For example, multiple guiding portions 1021 may be placed adjacent to each other to create an undulating or continuous wave shape as described in greater detail below (see, e.g., FIG. 12).

Figure 11A:
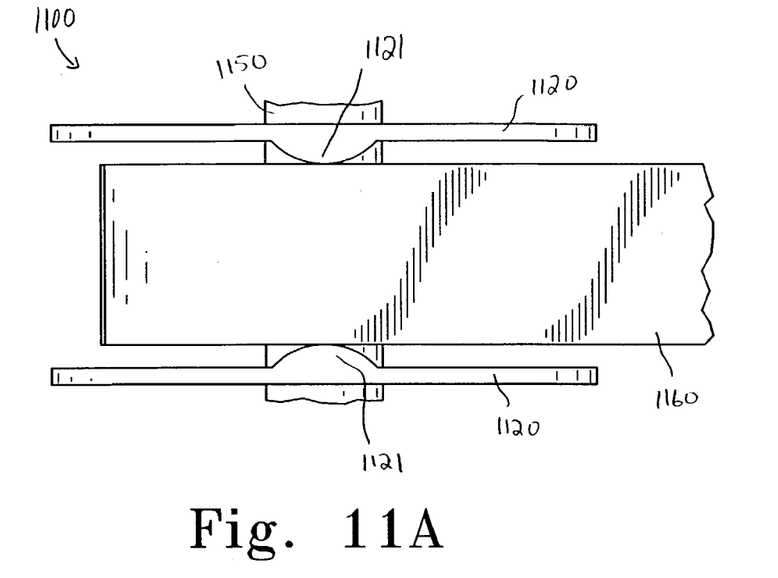
FIGS. 11A and 11B illustrate an exemplary take-up or supply reel and a plan view of an exemplary inner surface of a guiding member for a take-up or supply tape reel respectively.
Figure 11B:
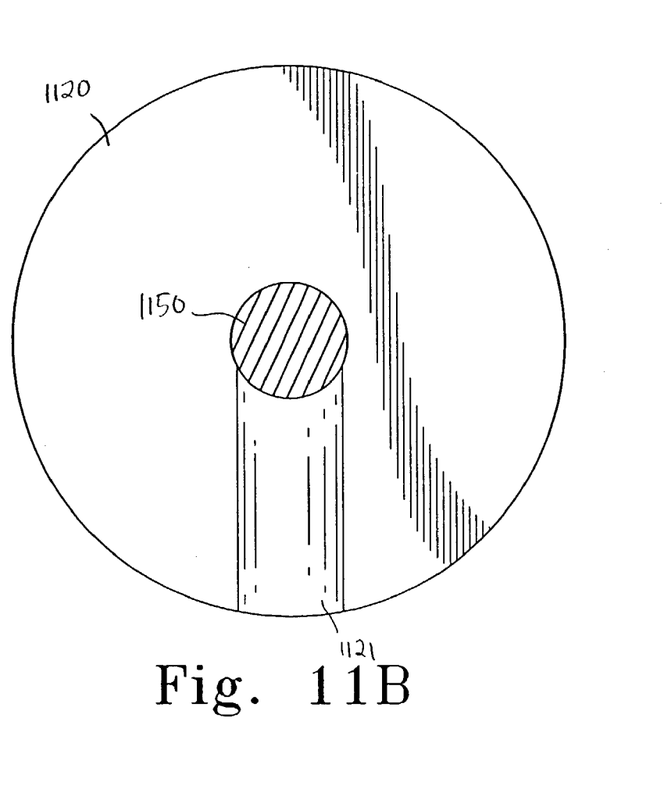

FIG. 11A illustrates another exemplary reel 1100 and FIG. 11B illustrates the inner surface of one guiding member 1120 of reel 1100. Reel 1100 is similar to reel 1000, except in this example guiding portions 1121 of guiding members 1120 are shaped as bumps as opposed to the wedge shaped guide portions 1020. Guiding portions 1121 operate similar to guiding portions 1021. As guiding members rotate to take-up and spool tape 1160 onto spooled tape 1161 of hub 1150, the portion of guiding members 1120 other than guiding portion 1121 are separated by a sufficient distance to allow tape 1160 to pass more easily therebetween. As guiding members 1120 rotate guiding portions 1121 guide and stack tape 1160 aligned with the previous wound loop of tape on spool 1161 as previously described.

Guiding portions 1021 and 1121 may be formed of a uniform shape, i.e., width and height, from the hub to the edge of guiding member 1020 and 1120 respectively. Alternatively, guiding portions 1021 and 1121 may be tapered to create a larger distance between guiding portions 1021 and 1121 closer to the edge of reel 1000 and 1100. A taper in guiding portions 1021 and 1121 may be made irrespective of any taper in guiding member 1020 and 1120. Similar to guiding member 1020 of reel 1000, guiding member 1120 may include multiple guiding portions 1121 positioned at various locations around guiding member 1120.

Figure 12:
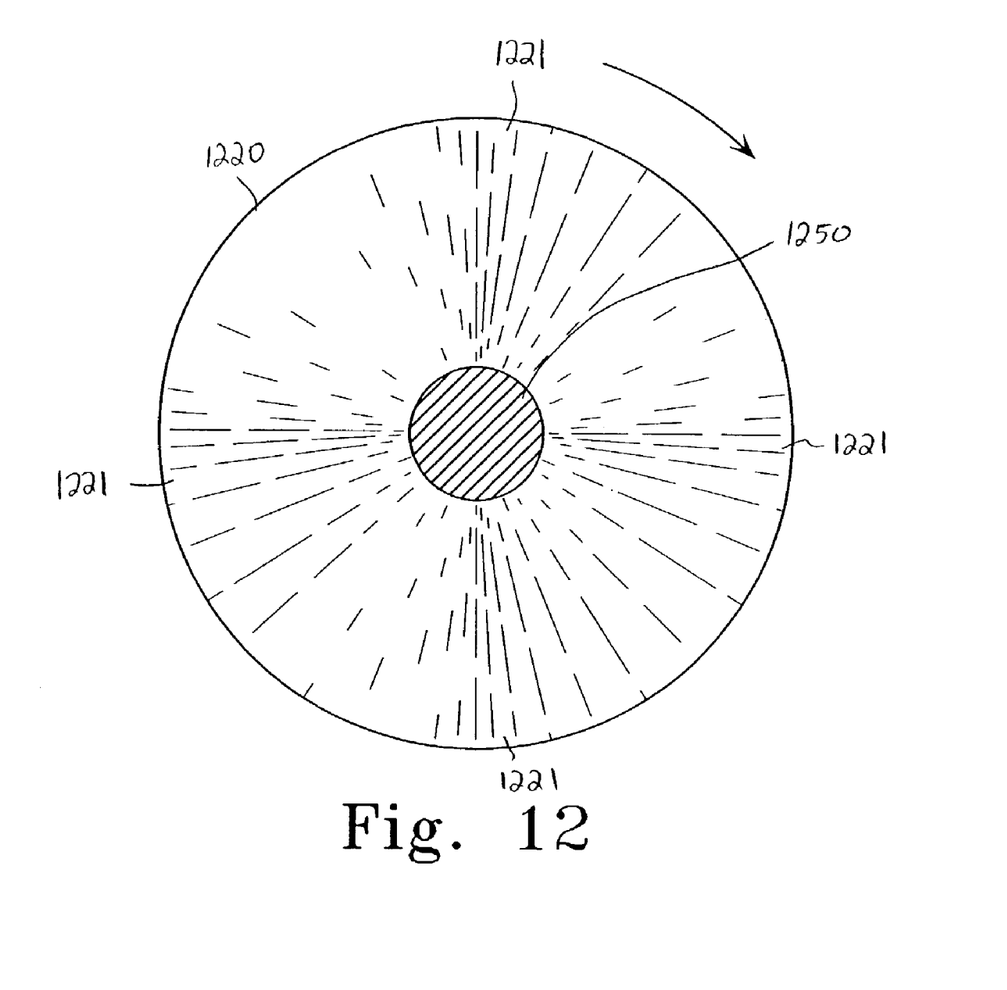
FIG. 12 illustrates a plan view of an exemplary inner surface of a guiding member for a take-up or supply tape reel.

FIG. 12 illustrates an exemplary plan view of the inner surface of a guiding member 1220 with multiple guiding portions 1221 that may be used with a tape reel. In this example, four guiding portions 1221 are disposed symmetrically around guiding member 1220 to create an undulating or wavy inner surface as guiding member 1220 rotates. In this example, the tape would be aligned and stacked to the spool of tape four times during each revolution of spool 1200, i.e., each guiding portion 1221 would align the tape. The corresponding opposite guiding member (not shown) would have high and low portions corresponding to guiding member 1220 to create alternating wide and narrow distances between a pair of guiding members 1220. The separation distance between a pair of guiding members 1220 may be between 0.502 and 0.520 inches or more in the wide regions and 0.498 to 0.505 inches in the narrow regions for 0.500 inch tape. The narrow regions are preferably less than 0.503 inches, and more preferably less than 0.500 inches, for a 0.500 inch tape.

Further, in one example the narrow and wide distances between a pair of guiding members 1220 differs progressively as the reel 1200 rotates. For example, two narrow regions (separated by a wide region) may be narrow to different degrees. The first narrow region may be 0.502 inches, followed by a wide region of 0.505, and the second narrow region 0.500 inches for a 0.500 inch tape. The wide regions may differ in distance progressively as well. The progression may be sequenced sequentially, i.e., each narrow region having a smaller distance between the guiding members 1220 for a complete revolution, or randomly, i.e., no specific pattern during a complete revolution.

Guiding members 1220 may include a taper, i.e., guiding members diverge with distance from hub 1250, in both the narrow and wide regions to reduce the potential for damage to the tape as it passes between the outer edge of guiding members 1220. Alternatively, depending on the particular application and shape of the narrow and wide regions, a taper is not necessary.

In other various examples, guiding member 1220 may include relatively flat regions disposed between multiple guiding portions similar to guiding portion 1021 (see FIG. 10C) or 1121 (see FIG. 11B) spaced apart far enough around the guiding member. Thus, instead of having a generally undulating inner surface, guiding member 1220 may have multiple wedges, bumps, or other contoured guiding portions formed on an otherwise substantially flat guiding member or flange.

Additionally, flange shaped guiding members and butterfly shaped guiding members have been described with opposing surfaces having corresponding or symmetrical shapes and contours to guide the tape. It should be recognized, however, that the opposing guide members need not correspond in their shape. For example, one guide member could be flat with no guiding portions, i.e., shapes or bumps, with the opposing guide member including a guiding portion. Additionally, each guide member could include guiding portions that are offset with respect to each other such that the upper guide portion guides the tape separately than the lower guide portion. For example, a first guide portion on an upper guide member might guide the tape down during a first portion of the rotation of the reel and a second guide portion on the lower guide member might guide the tape during a second portion of the rotation, where the first and second portions of the rotation are not aligned.

Figure 13A:
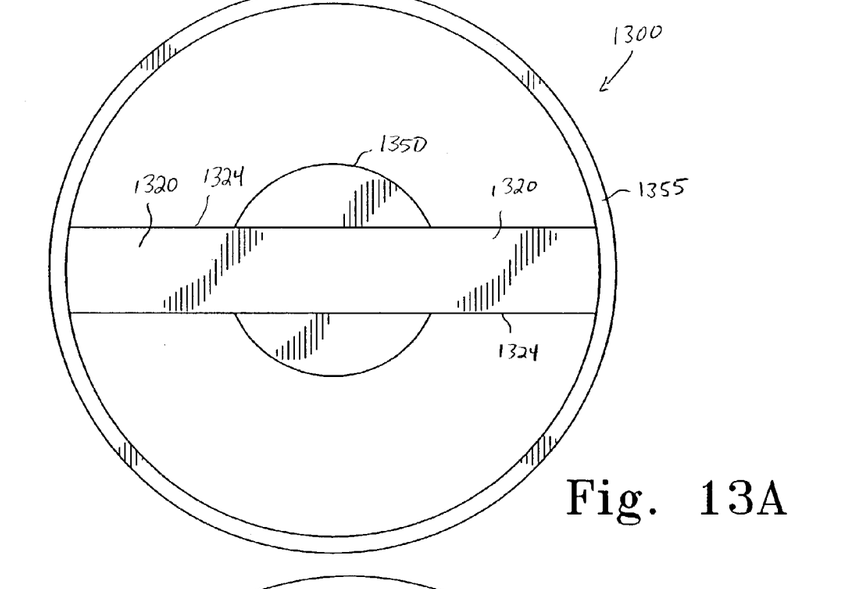
FIG. 13A-13B illustrate top views of exemplary take-up or supply tape reels.

FIG. 13A illustrates another exemplary reel 1300. Reel 1300 includes two outer rims 1355 and two pairs of guiding members 1320. Guiding members 1320 may be shaped similar to previously described guiding members, for example, in FIGS. 4A–C, 5, 6A, B, and 7. The spacing between outer rims 1355 should be sufficient to allow a tape to enter with reduced potential for damage to the tape edge. For example, the distance between outer rims 1355 may be equal to or larger than the leading edge 1324 of one of the guiding members 1320. Additionally, reel 1300 could operate with only a single guiding member pair 1320 attached to rims 1355. The second pair of guiding members 1320 could either be removed or formed only with a relatively large distance therebetween such that they do not act to guide and align the tape.

Figure 13B:
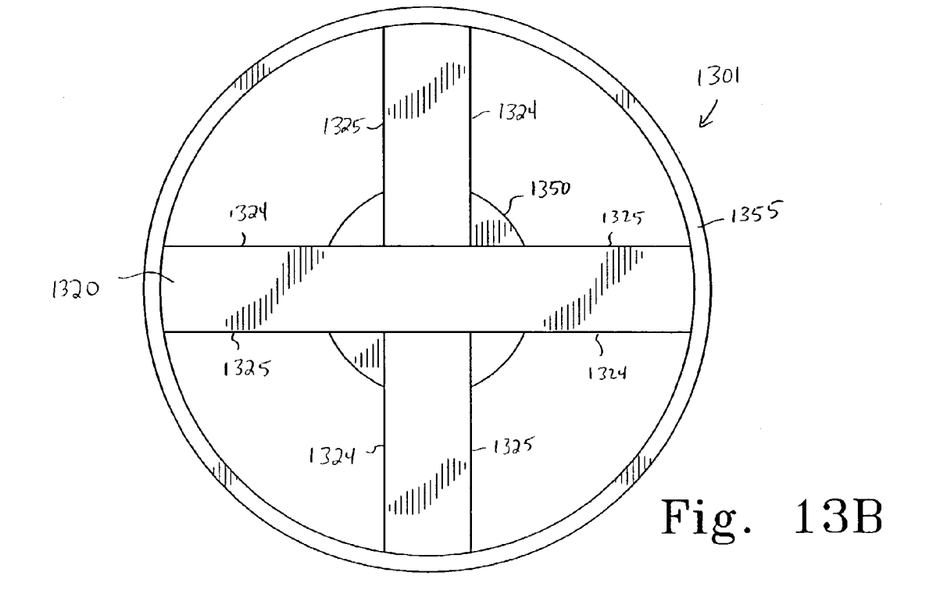

FIG. 13B illustrates a top view of another exemplary reel 1301. For example, any number of pairs of guiding members 1320 could be used as well as varying the shape, both from the top view and the cross-sectional profile view from the leading edge 1324 to trailing edge 1325. For example, simple wedge designs, rounded bumps, as well as other contoured shapes may be used to guide and align the tape as it is wound to the hub 1350. Further, any of these example may include a solid top or cap at substantially the same level as the rim, e.g., such that the distance between opposing sides does not interfere or damage the tape as it is spooled. A solid top or cap may be formed integrally with the guiding member 1320 and/or the rim 1350, or suitable attached thereto.

The above detailed description is provided to illustrate exemplary embodiments and is not intended to be limiting. It will be apparent to those skilled in the art that numerous modification and variations within the scope of the present invention are possible. For example, various designs of the guiding members of the butterfly type examples may be used with the guiding portions of the flange designs. Further, numerous other materials and processes not explicitly described herein may be used within the scope of the exemplary methods and structures described as will be recognized by those skilled in the art. Accordingly, the present invention is defined by the appended claims and should not be limited by the description herein.

What is claimed is:

1. A method for guiding tape as it is spooled onto a reel, comprising:
   receiving tape to be wrapped on a hub between guiding members, the guiding members having a leading edge that approaches the tape being wound prior to a trailing edge, wherein the opposing surfaces of the guiding members are contoured such that a separation distance between the guiding members varies from a wide separation located at the leading edges to a minimum separation located between the leading edges and trailing edges, and a distance of the minimum separation is less than the width of the tape without tension applied to the tape; and
   guiding at least one edge of the tape using the guide members as the tape begins to wrap and floats on a layer of air formed between the tape and a previously wound layer of the tape.

2. The method of claim 1, wherein the minimum separation between opposing surfaces of the guiding members is less than 0.500 inches, and the tape has a width of 0.500 inches without tension applied to the tape.

3. The method of claim 1, wherein the minimum separation between opposing surfaces of the guiding members is between 0.480 and 0.500 inches.

4. The method of claim 1, wherein the minimum separation between the guiding members is between 0.500 and 0.505 inches.

5. The method of claim 1, wherein the guiding members are tapered such that the distance between the guiding members increases with distance from the hub.

6. The method of claim 1, wherein the guiding members are not tapered such that the minimum distance between the opposing guiding members remains constant with distance from the hub.

7. The method of claim 1, further including a plurality of guiding members.

8. The method of claim 1, wherein there are two pairs of guiding members.

9. The method of claim 1, wherein at least one of the guiding members is integral with the hub.

10. The method of claim 1, wherein the guiding members are flexible.

11. The method of claim 1, further including positioners holding the guiding members to the hub, wherein the positioners shape the guiding members.

12. A tape reel, comprising:
   a hub for wrapping tape around; and
   guiding members for receiving tape to be spooled onto the hub between opposing surfaces of the guide members, the guiding members having a leading edge that approaches the tape being wound prior to a trailing edge, wherein the opposing surfaces of the guiding members are contoured such that a separation distance between the guiding members varies from a wide separation located at the leading edges to a minimum separation located between the leading edges and trailing edges, and a distance of the minimum separation is less than the width of the tape without tension applied to the tape, and
   wherein the guiding members are operable to guide at least one edge of the tape as the tape wraps a previously wound layer of the tape.

13. The reel of claim 12, wherein the minimum separation between opposing surfaces of the guiding members is less than 0.500 inches, and the tape has a width of 0.500 inches without tension applied to the tape.

14. The reel of claim 12, wherein the minimum separation between opposing surfaces of the guiding members is between 0.480 and 0.500 inches.

15. The reel of claim 12, wherein the minimum separation between the guiding members is between 0.500 and 0.505 inches.

16. The reel of claim 12, wherein the guiding members are tapered such that the distance between the guiding members increases with distance from the hub.

17. The reel of claim 12, wherein the guiding members are not tapered such that the minimum distance between the opposing guiding members remains constant with distance from the hub.

18. The reel of claim 12, further including a plurality of guiding members.

19. The reel of claim 12, wherein there are two pairs of guiding members.

20. The reel of claim 12, wherein at least one guiding members is integral with the hub.

21. The reel of claim 12, wherein the guiding members are flexible.

22. The reel of claim 12, further including positioners holding the guiding members to the hub, wherein the positioners shape the guiding members.

23. A tape drive including a take-up reel for receiving tape, the tape drive comprising:
- a read/write head wherein tape streams past the read/write head to the take-up reel, the take-up reel including:
- a hub around which tape is wrapped; and
- guiding members for receiving tape to be spooled onto the hub between opposing surfaces of the guiding members, the guiding members having a leading edge that approaches the tape being wound prior to a trailing edge, wherein the opposing surfaces of the guiding members are contoured such that a separation distance between the guiding members varies from a wide separation located at the leading edges to a minimum separation located between the leading edges and trailing edges, and a distance of the minimum separation is less than the width of the tape without tension applied to the tape, and
- wherein the guide members are operable to guide at least one edge of the tape as the tape wraps a previously wound layer of the tape.

24. The tape drive of claim 23, wherein the minimum separation between opposing surfaces of the guiding members is less than 0.500 inches, and the tape has a width of 0.500 inches without tension applied to the tape.

25. The tape drive of claim 23, wherein the minimum separation between opposing surfaces of the guiding members is between 0.480 and 0.500 inches.

26. The tape drive of claim 23, wherein the minimum separation between the guiding members is between 0.500 and 0.505 inches.

27. The tape drive of claim 23, wherein the guiding members are tapered such that the distance between the guiding members increases with distance from the hub.

28. The tape drive of claim 23, wherein the guiding members are not tapered such that the minimum distance between the opposing guiding members remains constant with distance from the hub.

29. The tape drive of claim 23, wherein each of the guide members are shaped as guide arms with a leading edge that approaches the tape prior to a trailing edge.

30. The tape drive of claim 23, further including a plurality of guiding members.

31. The tape drive of claim 23, wherein there are two pairs of guiding members.

32. The tape drive of claim 23, wherein at least one guiding member is integral with the hub.

33. The tape drive of claim 23, wherein the guiding members are flexible.

34. The tape drive of claim 23, further including positioners holding the guiding members to the hub, wherein the positioners shape the guiding members.

* * * * *